(12) United States Patent
Yamazaki et al.

(10) Patent No.: US 8,482,005 B2
(45) Date of Patent: Jul. 9, 2013

(54) DISPLAY DEVICE COMPRISING AN OXIDE SEMICONDUCTOR LAYER

(75) Inventors: Shunpei Yamazaki, Setagaya (JP); Hajime Kimura, Atsugi (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 240 days.

(21) Appl. No.: 12/957,772

(22) Filed: Dec. 1, 2010

(65) Prior Publication Data
US 2011/0134345 A1 Jun. 9, 2011

(30) Foreign Application Priority Data
Dec. 4, 2009 (JP) ................. 2009-276374

(51) Int. Cl.
H01L 29/04 (2006.01)
H01L 31/036 (2006.01)
H01L 31/0376 (2006.01)
H01L 31/20 (2006.01)

(52) U.S. Cl.
USPC .. 257/59; 257/72; 257/E29.117; 257/E29.273

(58) Field of Classification Search
USPC ............. 257/59, 72, 347, E29.117, E29.273
See application file for complete search history.

(56) References Cited

U.S. PATENT DOCUMENTS

| | | |
|---|---|---|
| 5,731,856 A | 3/1998 | Kim et al. |
| 5,744,864 A | 4/1998 | Cillessen et al. |
| 5,844,538 A | 12/1998 | Shiraki et al. |
| 6,294,274 B1 | 9/2001 | Kawazoe et al. |
| 6,563,174 B2 | 5/2003 | Kawasaki et al. |
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |

(Continued)

FOREIGN PATENT DOCUMENTS

| | | |
|---|---|---|
| EP | 1737044 A | 12/2006 |
| EP | 1843194 | 10/2007 |

(Continued)

OTHER PUBLICATIONS

International Search Report (Application No. PCT/JP2010/070160) Dated Jan. 18, 2011.

(Continued)

*Primary Examiner* — Hoai V Pham
(74) *Attorney, Agent, or Firm* — Eric J. Robinson; Robinson Intellectual Property Law Office, P.C.

(57) ABSTRACT

The time taken to write a signal to a pixel is shortened in a display device. Further, a signal is written at high speed even when high voltage is applied. The display device includes a pixel including a transistor and a liquid crystal element electrically connected to a source or a drain of the transistor. The transistor includes an intrinsic or substantially intrinsic oxide semiconductor as a semiconductor material and has an off-state current of $1\times10^{-17}$ A/μm or less. The pixel does not include a capacitor. Since it is not necessary to provide a capacitor, the time taken to write a signal can be shortened.

18 Claims, 13 Drawing Sheets

U.S. PATENT DOCUMENTS

| | | | |
|---|---|---|---|
| 7,297,977 | B2 | 11/2007 | Hoffman et al. |
| 7,323,356 | B2 | 1/2008 | Hosono et al. |
| 7,385,224 | B2 | 6/2008 | Ishii et al. |
| 7,402,506 | B2 | 7/2008 | Levy et al. |
| 7,411,209 | B2 | 8/2008 | Endo et al. |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,674,650 | B2 | 3/2010 | Akimoto et al. |
| 7,732,819 | B2 | 6/2010 | Akimoto et al. |
| 2001/0046027 | A1 | 11/2001 | Tai et al. |
| 2002/0056838 | A1 | 5/2002 | Ogawa |
| 2002/0132454 | A1 | 9/2002 | Ohtsu et al. |
| 2003/0189401 | A1 | 10/2003 | Kido et al. |
| 2003/0218222 | A1 | 11/2003 | Wager et al. |
| 2004/0038446 | A1 | 2/2004 | Takeda et al. |
| 2004/0127038 | A1 | 7/2004 | Carcia et al. |
| 2005/0017302 | A1 | 1/2005 | Hoffman |
| 2005/0199959 | A1 | 9/2005 | Chiang et al. |
| 2006/0035452 | A1 | 2/2006 | Carcia et al. |
| 2006/0043377 | A1 | 3/2006 | Hoffman et al. |
| 2006/0091793 | A1 | 5/2006 | Baude et al. |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0169973 | A1 | 8/2006 | Isa et al. |
| 2006/0170111 | A1 | 8/2006 | Isa et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0024187 | A1 | 2/2007 | Shin et al. |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0236640 | A1 | 10/2007 | Kimura |
| 2007/0252928 | A1 | 11/2007 | Ito et al. |
| 2007/0272922 | A1 | 11/2007 | Kim et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0073653 | A1 | 3/2008 | Iwasaki |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0166834 | A1 | 7/2008 | Kim et al. |
| 2008/0182358 | A1 | 7/2008 | Cowdery-Corvan et al. |
| 2008/0224133 | A1 | 9/2008 | Park et al. |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0296568 | A1 | 12/2008 | Ryu et al. |
| 2009/0068773 | A1 | 3/2009 | Lai et al. |
| 2009/0073325 | A1 | 3/2009 | Kuwabara et al. |
| 2009/0114910 | A1 | 5/2009 | Chang |
| 2009/0134399 | A1 | 5/2009 | Sakakura et al. |
| 2009/0152506 | A1 | 6/2009 | Umeda et al. |
| 2009/0152541 | A1 | 6/2009 | Maekawa et al. |
| 2009/0278122 | A1 | 11/2009 | Hosono et al. |
| 2009/0280600 | A1 | 11/2009 | Hosono et al. |
| 2010/0065844 | A1 | 3/2010 | Tokunaga |
| 2010/0092800 | A1 | 4/2010 | Itagaki et al. |
| 2010/0109002 | A1 | 5/2010 | Itagaki et al. |
| 2011/0032435 | A1 | 2/2011 | Kimura |
| 2011/0090183 | A1* | 4/2011 | Yamazaki et al. ............ 345/204 |

FOREIGN PATENT DOCUMENTS

| | | | |
|---|---|---|---|
| EP | 2226847 | A | 9/2010 |
| JP | 60-198861 | A | 10/1985 |
| JP | 63-210022 | A | 8/1988 |
| JP | 63-210023 | A | 8/1988 |
| JP | 63-210024 | A | 8/1988 |
| JP | 63-215519 | A | 9/1988 |
| JP | 63-239117 | A | 10/1988 |
| JP | 63-265818 | A | 11/1988 |
| JP | 64-010299 | | 1/1989 |
| JP | 64-010299 | A | 1/1989 |
| JP | 05-251705 | A | 9/1993 |
| JP | 07-199149 | | 8/1995 |
| JP | 08-264794 | A | 10/1996 |
| JP | 11-505377 | | 5/1999 |
| JP | 11-274504 | | 10/1999 |
| JP | 2000-044236 | A | 2/2000 |
| JP | 2000-150900 | A | 5/2000 |
| JP | 2002-055326 | | 2/2002 |
| JP | 2002-076356 | A | 3/2002 |
| JP | 2002-289859 | A | 10/2002 |
| JP | 2003-086000 | A | 3/2003 |
| JP | 2003-086808 | A | 3/2003 |
| JP | 2004-103957 | A | 4/2004 |
| JP | 2004-273614 | A | 9/2004 |
| JP | 2004-273732 | A | 9/2004 |
| JP | 2006-165532 | | 6/2006 |
| JP | 2007-298976 | | 11/2007 |
| WO | WO-2004/114391 | | 12/2004 |

OTHER PUBLICATIONS

Written Opinion (Application No. PCT/JP2010/070160) Dated Jan. 18, 2011.

Fortunato.E et al., "Wide-Bandgap High-Mobility ZNO Thin-Film Transistors Produced at Room Temperature,", Appl. Phys. Lett. (Applied Physics Letters) Sep. 27, 2004, vol. 85, No. 13, pp. 2541-2543.

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04: SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Pysics Letters) Jun. 26, 2007, vol. 90, No. 26, pp. 262106-1-262106-3.

Takahashi.M et al., "Theoretical Analysis of IGZO Transparent Amorphous Oxide Semiconductor,", IDW '08: Proceedings of the 15th International Display Workshops, Dec. 3, 2008, pp. 1637-1640.

Hayashi.R et al., "42.1: Invited Paper: Improved Amorphous In-Ga-Zn-0 TFTS,", SID Digest '08 : SID International Symposim Digest of Technical Papers, May 20, 2008, vol. 39, pp. 621-624.

Prins.M et al., "A Ferroelectric Transparent Thin-Film Transistor,", Appl. Phys. Lett. (Applied Physics Letters) Jun. 17, 1996, vol. 68, No. 25, pp. 3650-3652.

Nakamura.M et al., "The phase relations in the In2O3-Ga2ZnO4-ZnO system at 1350° C.,", Journal of Solid State Chemistry, Aug. 1, 1991, vol. 93, No. 2, pp. 298-315.

Kimizuka.N. et al., "Syntheses and Single-Crystal Data of Homologous Compounds, In2O3(ZnO)m (m=3, 4, and 5) InGaO3(ZnO)3, and Ga2O3(ZnO)m (m=7, 8, 9, and 16) in the In2O3-ZnGa2O4-ZnO System, ", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.

Asakuma.n et al., "Crystallization and Reduction of Sol-Gel-Derived Zinc Oxide Films by Irradiation with Ultraviolet Lamp,", Journal of Sol-gel Science and Technology, 2003, vol. 26, pp. 181-184.

Osada.T et al., "15.2: Development of Driver-Integrated Panel using Amorphous In-Ga-Zn-Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters) , Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3-In2O3-ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDS,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett (Physical Review Letters), Jul. 31, 2000, vol. 85, No. 5, pp. 1012-1015.

Fung.T et al., "2-D Numerical Simulation of High Performance Amorphous In-Ga-Zn-O TFTs for Flat Panel Displays,", AM-FPD '08 Digest of Tecnical Papers Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits , 2008, vol. 43, No. 1, pp. 292-299.

Ohara.H et al., "Amorphous In-Ga-Zn-Oxide TFTs with Suppressed Variation for 4.0 inch QVGA AMOLED Display,", AM-FPD '09 Digest of Tecnical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:AL and SN-Doped Zinc Indium Oxide Thin Film Transistors for AMOLED Back-Plane,", SID Digest '09 : SID International Symposium Digeest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Sumposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 ; SID International Symposium Digest of Technical Papers, May 31, 2009, pp. 983-985.

Sakata.J et al., "Development of 4.0-In. AMOLED Display With Driver Circuit Using Amorphous In-Ga-Zn-Oxide TFTS,", IDW '09 : Proceedings of the 16th International Display Workshops, 2009, pp. 689-692.

Park.J et al., "Amorphous Indium-Gallium-Zinc Oxide TFTS and Their Application for Large Size AMOLED,",AM-FPD '08 Digest of Technical Papers, Jul. 2, 2008, pp. 275-278.

Park.S et al., "Challenge to Future Displays: Transparent AM-OLED Driven by PEALD Grown ZnO TFT,", IMID '07 Digest, 2007, pp. 1249-1252.

Godo.H et al., "Temperature Dependence of Characteristics and Electronic Structure for Amorphous In-Ga-Zn-Oxide TFT,", AM-FPD '09 Digest of Technical Papers, Jul. 1, 2009, pp. 41-44.

Osada.T et al., "Development of Driver-Integrated Panel Using Amorphous In-Ga-Zn-Oxide TFT,", AM-FPD '09 Digest of Technical Papers, Jul. 1, 2009, pp. 33-36.

Hirao.T et al., "Novel Top-Gate Zinc Oxide Thin-Film Transistors (ZNO TFTS) For AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In-Ga-Zn-Oxide TFT,", SID Digest'09 : SID International Symposium Digest of Technical Papers, May 31, 2009, pp. 1110-1112.

Ohara.H et al., "21.3:4.0 in. QVGA AMOLED Display Using In-Ga-Zn-Oxide TFTS With a Novel Passivation Layer,", SID Digest '09 : SID International Symposium Digest of Technical Papers, May 31, 2009, pp. 284-287.

Miyasaka.M, "SUFTLA Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Apploications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al. "Spinel,YBFE2O4 and YB2FE3O7 Types of Structures for compounds in The IN2O3 and SC2O3-A2O3-BO Systems [A; FE, GA, OR AL; B: MG, MN, FE, NI, CU,OR ZN] at Temperatures over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics), 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water,", Appl. Phys. Lett. (Applied Physics Letters), 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters), 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci.Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H-11009-H1014.

Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.

* cited by examiner

Energy band diagram in A-A' cross seection

Energy band diagram in A-A' cross seection

Energy band diagram in B-B' cross seection (+V$_G$)

Energy band diagram in B-B' cross seection (-V$_G$)

DISPLAY DEVICE COMPRISING AN OXIDE SEMICONDUCTOR LAYER

TECHNICAL FIELD

The technical field of the present invention relates to a semiconductor device and a manufacturing method thereof. Further, the technical field of the present invention relates to a display device including the semiconductor device and a driving method thereof.

BACKGROUND ART

As liquid crystal display devices, active matrix liquid crystal display devices in which pixels include switch elements are widely used. As illustrated in FIG. 13, a pixel 5000 includes a transistor 5001 which functions as a switch element, a liquid crystal element 5002 to which a video signal is input from a wiring 5004 through the transistor 5001, and a capacitor element 5003 which holds the video signal written to the liquid crystal element 5002. With provision of the capacitor element 5003, a video signal can be held even when the switch element is off.

Silicon, which has broad utility, is used as the semiconductor material of a transistor. However, in recent years, not only broad utility but also improvement in performance has been expected, and a technique related to a field effect transistor (also referred to as FET) including an oxide semiconductor has attracted attention (see Reference 1).

Further, in order to reduce the response time of a liquid crystal, a technique for instantaneously applying high voltage to the liquid crystal before a video signal is written (i.e., overdrive) has been performed (see Reference 2).

REFERENCES

[Reference 1] Japanese Published Patent Application No. 2006-165532
[Reference 2] Japanese Published Patent Application No. S64-010299

DISCLOSURE OF INVENTION

In a conventional liquid crystal display device, it is necessary to store the combined capacitance ($C_{LC}+C_S$) due to the liquid crystal capacitance $C_{LC}$ of a liquid crystal element and the storage capacitance $C_S$ of a capacitor (in general, the capacitance $C_S$ is greater than or equal to 100 fF and less than or equal to 300 fF). Thus, considering a time constant $\tau=R(C_{LC}+C_S)$ which is necessary for storing electric charge, there is a problem in that it takes a longer time to write a signal by the time taken to store the storage capacitance $C_S$. The symbol R indicates the on resistance of a transistor.

In particular, in the case where overdrive is performed as disclosed in Reference 2, it is necessary to apply high voltage instantaneously. However, due to the time taken to store electric charge in a capacitor, the time taken to reach desired voltage becomes longer.

These problems become evident as the storage capacitance $C_S$ becomes higher. However, if a capacitor is not provided, it is difficult to hold a signal by using a transistor of a semiconductor material disclosed in Reference 1 because the off-state current of the transistor is high. Therefore, in the conventional liquid crystal display device, provision of the capacitor is essential.

In view of the foregoing problems, it is an object to shorten the time taken to store electric charge in a capacitor and to write a signal at high speed in a display device.

It is an object to provide a display device in which a signal can be written at high speed even when high voltage is applied, for example, even when overdrive is performed.

One embodiment of the present invention is a display device which includes a pixel having a transistor and a liquid crystal element electrically connected to a source or a drain of the transistor. The transistor includes an oxide semiconductor as a semiconductor material. The capacitance of a capacitor in the pixel is reduced. It is preferable that capacitor be not provided. It is more preferable that a capacitor be not provided intentionally and capacitance (parasitic capacitance) generated unintentionally is actively reduced. The parasitic capacitance is preferably less than or equal to 50 fF, more preferably less than or equal to 10 fF.

Another embodiment of the present invention is a display device which includes a pixel having a transistor, a first electrode electrically connected to a source or a drain of the transistor, a liquid crystal layer formed over the first electrode, and a second electrode provided below the first electrode with an insulating film provided therebetween. The first electrode and the second electrode do not overlap with each other, and an end portion of the first electrode and an end portion of the second electrode are aligned with each other. The transistor includes an oxide semiconductor as a semiconductor material. The pixel does not include a capacitor.

Further, the oxide semiconductor included in the transistor is an intrinsic (also referred to as i-type) or substantially intrinsic oxide semiconductor, and the off-state current of the transistor is $1\times10^{-17}$ A/μm or less.

Furthermore, overdrive is employed by which voltage higher than or equal to the voltage of a video signal is input before the video signal is input to the liquid crystal element.

The time taken to store electric charge in a capacitor can be shortened; thus, a signal can be written to a pixel at high speed.

Further, when the time taken to store electric charge in the capacitor is shortened, even high voltage can be applied in a short time; thus, overdrive can be effectively performed.

BRIEF DESCRIPTION OF DRAWINGS

In the accompanying drawings.

BEST MODE FOR CARRYING OUT THE INVENTION

Figure 1:
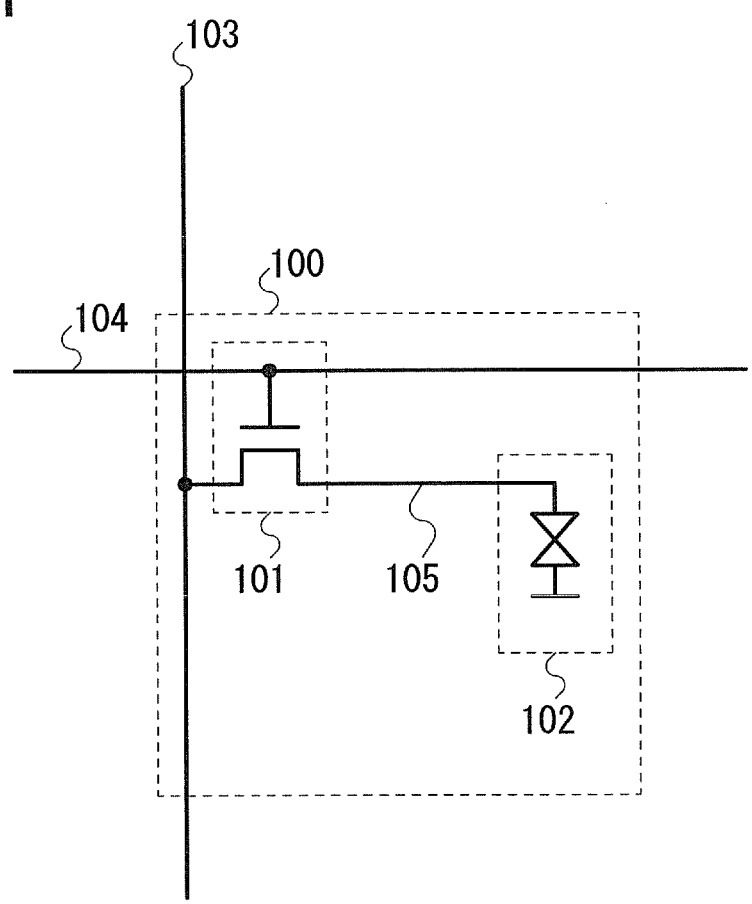
FIG. 1 illustrates a pixel in a display device.

Examples of embodiments of the present invention will be described below with reference to the drawings. Note that the present invention is not limited to the following description. It will be readily appreciated by those skilled in the art that modes and details of the present invention can be changed in various ways without departing from the spirit and scope of the present invention. Therefore, the present invention should not be construed as being limited to the following description of the embodiments.

Note that the position, size, range, or the like of each component illustrated in drawings and the like is not accurately represented in some cases for easy understanding. Therefore, the disclosed invention is not necessarily limited to the position, size, range, or the like disclosed in the drawings and the like.

Note that in this specification and the like, terms such as "first" and "second" are used in order to avoid confusion among components and do not limit the number.

Embodiment 1

An example of a pixel in a liquid crystal display device is described with reference to FIG. 1. Elements included in a pixel 100 are a transistor 101 which functions as a switch element and a liquid crystal element 102.

A gate of the transistor 101 is electrically connected to a wiring 103 (a gate signal line). One of a source and a drain of the transistor 101 is electrically connected to a wiring 104 (a source signal line). The other is electrically connected to the liquid crystal element 102.

In this embodiment, an intrinsic or substantially intrinsic oxide semiconductor is used as the semiconductor material of the transistor 101, and the off-state current per micrometer of the channel width of the transistor 101 is $1\times10^{-17}$ A or less ($1\times10^{-17}$ A/µm or less).

When the off-state current of the transistor 101 is $1\times10^{-17}$ A/µm or less, it means that the amount of leakage current is substantially zero when the transistor 101 is off. In other words, the potential of a node 105 does not fluctuate even when the transistor 101 is off; thus, a signal written to the pixel is held.

Thus, as illustrated in FIG. 1, the pixel 100 does not necessarily include a capacitor. In other words, a capacitor wiring may be omitted. When the pixel illustrated in FIG. 1 is compared to the conventional pixel illustrated in FIG. 13, the time taken to store the storage capacitance $C_S$ of a capacitor is not needed; thus, a signal can be written to the pixel at high speed.

With such a pixel structure where a capacitor is not necessarily provided, overdrive can be effectively performed. Overdrive is described with reference to FIG. 11.

Figure 11:
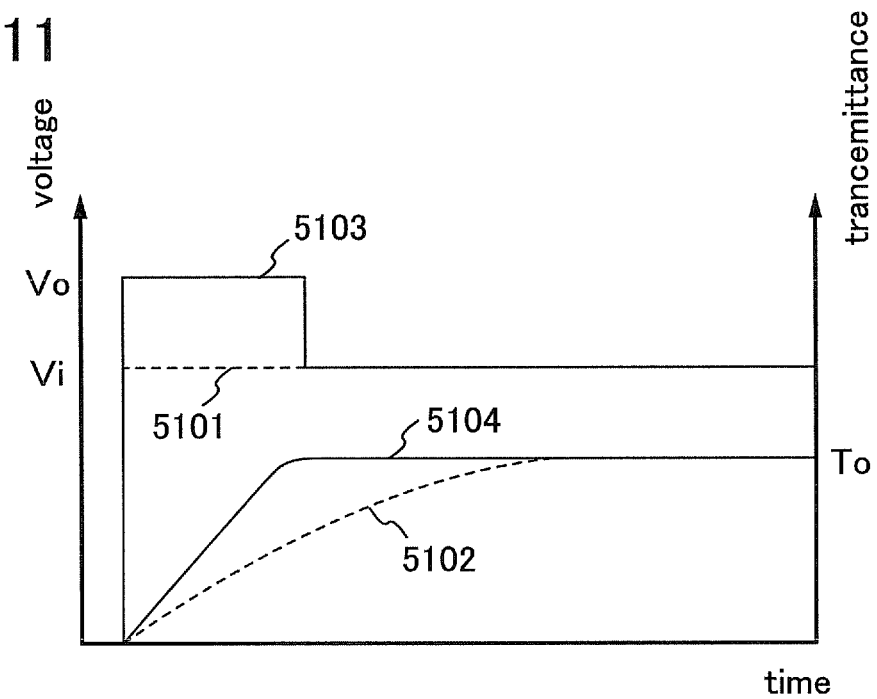
FIG. 11 illustrates overdrive.

FIG. 11 shows a time change in transmittance of a liquid crystal with respect to voltage applied. When overdrive is not performed, the transmittance changes with respect to voltage Vi of a video signal that is indicated by a broken line 5101 over time as indicated by a broken line 5102 and reaches desired transmittance To.

In contrast, when overdrive is performed, by application of overdrive voltage Vo which is higher than the voltage Vi as indicated by a solid line 5103, the time taken to reach the desired transmittance To can be shortened as indicated by a solid line 5104. When voltage applied is made instantaneously high (or low) before writing of a signal in this manner, the response time of a liquid crystal can be reduced.

However, when high voltage such as the overdrive voltage Vo is instantaneously applied, the adverse effect of the time taken to store electric charge in a capacitor becomes more evident, so that the time taken to reach desired voltage becomes longer. Thus, with a pixel structure where a capacitor is not necessarily provided, the time taken to store electric charge in a capacitor can be shortened and even high voltage can be applied in a short time. Therefore, overdriving can be effectively performed.

Further, such a pixel structure is also effective when frame rate doubling is employed in a liquid crystal display device. In the frame rate doubling, the number of frames to be displayed is increased; thus, it is necessary to input a signal to a pixel at higher speed. Thus, with a pixel structure where a capacitor is not necessarily provided, the time taken to store electric charge in a capacitor can be shortened and frame rate doubling can be effectively performed.

The above structure and advantageous effects can be obtained when the transistor 101 is formed using an intrinsic or substantially intrinsic oxide semiconductor and the off-state current of the transistor 101 is $1\times10^{-17}$ A/µm or less.

In contrast, a conventional oxide semiconductor has n-type conductivity and an off-state current of about $1\times10^{-9}$ A/µm at the minimum. Therefore, a capacitor in a pixel is essential, and the time taken to write a signal is long.

Here, the conducting mechanism of a transistor including an oxide semiconductor in this embodiment is described with reference to FIG. 5, FIG. 6, FIGS. 7A and 7B, and FIGS. 8A and 8B. Note that the following description is based on the assumption of an ideal situation for easy understanding and does not necessarily reflect a real situation. Further, the following description is just a consideration and does not influence the validity of the present invention.

Figure 5:
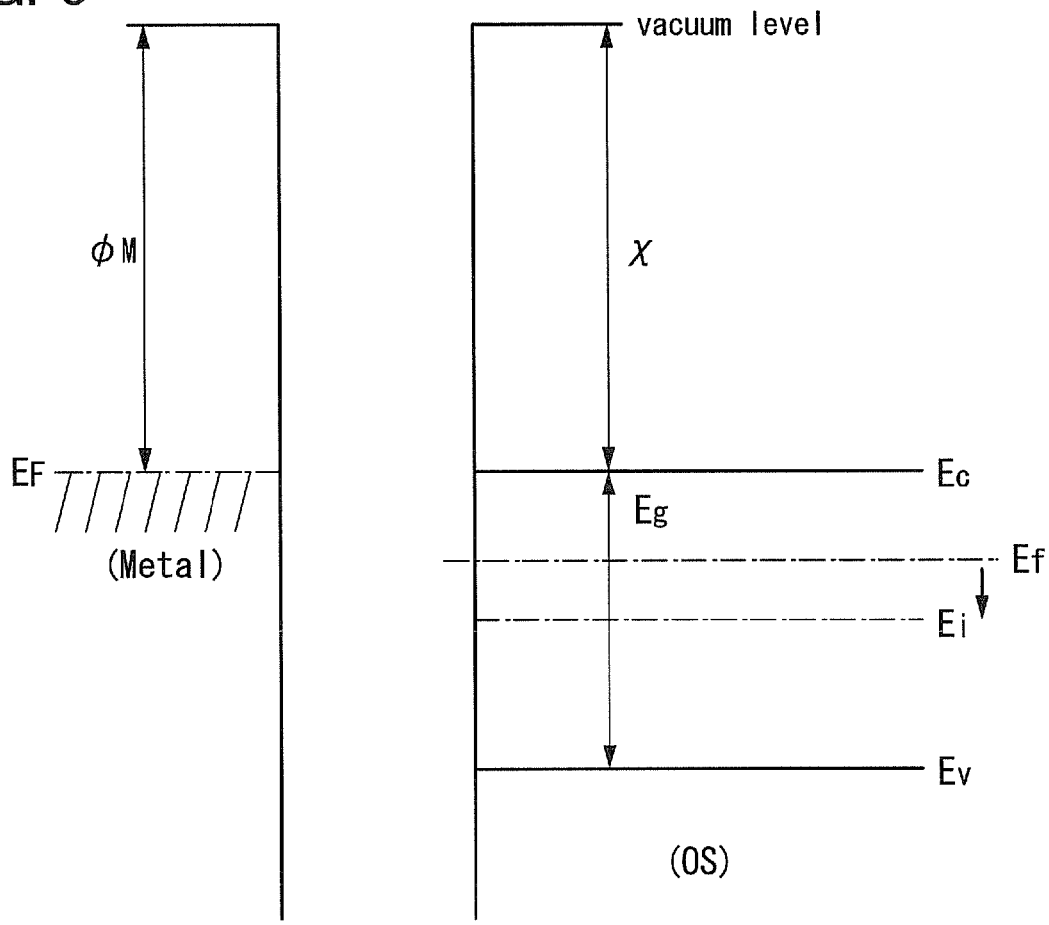
FIG. 5 is an energy band diagram.

FIG. 5 illustrates a relationship between a vacuum level, the work function ($\phi_M$) of a metal (Metal), and the electron affinity ($\chi$) of an oxide semiconductor (OS). The Fermi level of the metal is denoted by $E_F$. The Fermi level of the oxide semiconductor is denoted by $E_f$. The energy at the bottom of the conduction band is denoted by $E_C$. The energy at the top of the valence band is denoted by $E_V$. The intrinsic Fermi level is denoted by $E_i$. The energy band gap of the oxide semiconductor is denoted by $E_g$. Note that the energy band gap ($E_g$) of the oxide semiconductor is 3 to 3.5 eV.

In FIG. 5, in the case of a conventional oxide semiconductor having n-type conductivity, the Fermi level ($E_f$) is apart from the intrinsic Fermi level ($E_i$) positioned in the middle of the band gap ($E_g$) and is positioned near the conduction band ($E_C$).

Here, when the oxide semiconductor is made closer to an intrinsic semiconductor by the decrease in carrier density, the Fermi level ($E_f$) of the oxide semiconductor becomes closer to the intrinsic Fermi level ($E_i$). In this embodiment, an intrinsic or substantially intrinsic oxide semiconductor is in a state in which carrier density is decreased and the Fermi level ($E_f$) is made closer or equal to the intrinsic Fermi level ($E_i$).

The intrinsic or substantially intrinsic oxide semiconductor in this embodiment is obtained based on the following technical idea.

Hydrogen contained in an oxide semiconductor is one of the factors that make the oxide semiconductor have n-type conductivity. In the oxide semiconductor, part of hydrogen serves as a donor and forms a shallow level which is 0.1 to 0.2 eV below the conduction band, so that carrier concentration is increased.

Deficiency of oxygen (oxygen deficiency) which is a main component of the oxide semiconductor is also one of the factors that make the oxide semiconductor have n-type conductivity. The oxygen deficiency forms a deep donor level in the oxide semiconductor, so that carrier concentration is increased.

Although many studies on physical properties of a semiconductor, such as density of states (DOS), have been conducted, they do not include an idea of sufficiently reducing a defect level itself In this embodiment, a highly purified intrinsic oxide semiconductor is obtained by removal of water or hydrogen, which might increase the DOS, from the oxide semiconductor. This is based on an idea of sufficiently reducing the DOS itself. Thus, excellent industrial products can be manufactured.

In other words, in this embodiment, an impurity such as hydrogen, which is one of the factors that make the oxide semiconductor have n-type conductivity, is removed from an oxide semiconductor as much as possible, and the oxide semiconductor is highly purified by removal of oxygen deficiency. When the oxide semiconductor is highly purified, an intrinsic or substantially intrinsic oxide semiconductor can be obtained. Thus, in FIG. 5, the Fermi level ($E_f$) can be substantially equal to the intrinsic Fermi level ($E_i$).

Specifically, the concentration of hydrogen in the oxide semiconductor is decreased to $5 \times 10^{19}/cm^3$ or lower, preferably $5 \times 10^{18}/cm^3$ or lower, more preferably $5 \times 10^{17}/cm^3$ or lower. Further, the carrier concentration of the oxide semiconductor is preferably much lower than that of a conventional oxide semiconductor (for example, lower than $1 \times 10^{12}/cm^3$, preferably $1.45 \times 10^{10}/cm^3$ or lower).

Figure 6:
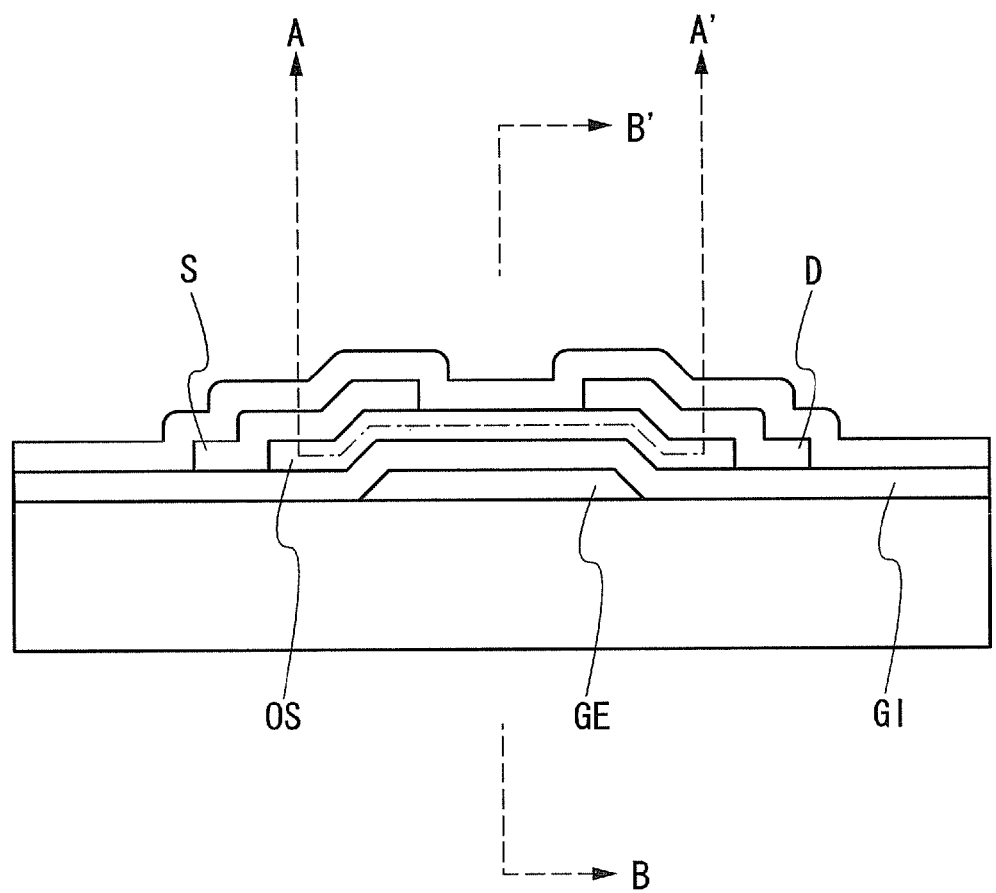
FIG. 6 illustrates a transistor including an oxide semiconductor.

FIG. 6 illustrates an example of a bottom-gate thin film transistor with an inverted staggered structure that is formed using an intrinsic or substantially intrinsic oxide semiconductor. An oxide semiconductor layer (OS) is provided over a gate electrode (GE) with a gate insulating film (GI) provided therebetween. A source electrode (S) and a drain electrode (D) are provided thereover.

It is preferable that a Schottky electron barrier be not formed between the oxide semiconductor, and the source electrode and the drain electrode. In this embodiment, the electron affinity ($\chi$) of the oxide semiconductor is substantially equal to the work function ($\phi_M$) of a metal used for the source electrode and the drain electrode. For example, it is said that the electron affinity ($\chi$) is 4.3 eV in the case where the band gap ($E_g$) of the oxide semiconductor is 3.15 eV; thus, the source electrode and the drain electrode may be formed with a structure in which titanium (Ti), which has a work function ($\phi_M$) of about 4.3 eV, is in contact with the oxide semiconductor.

Figure 7A:
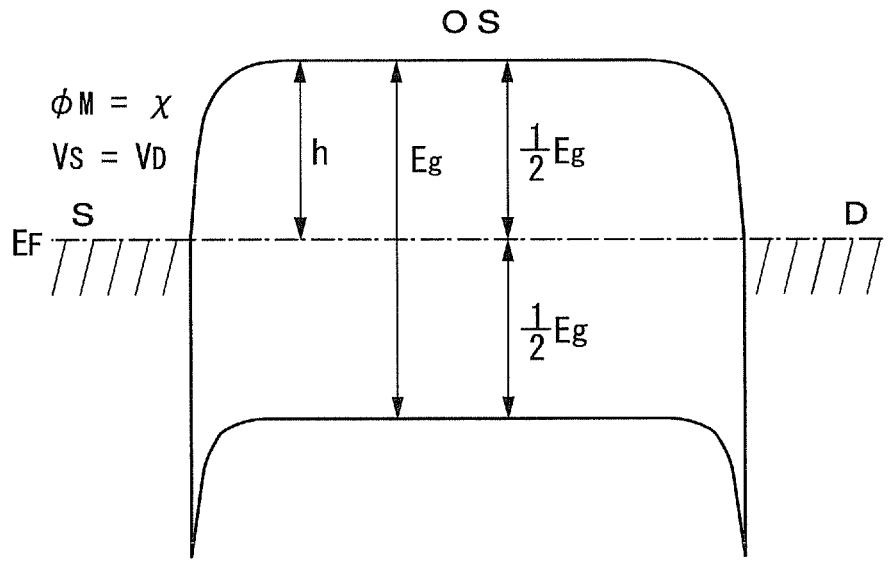
FIGS. 7A and 7B are energy band diagrams.
Figure 7B:
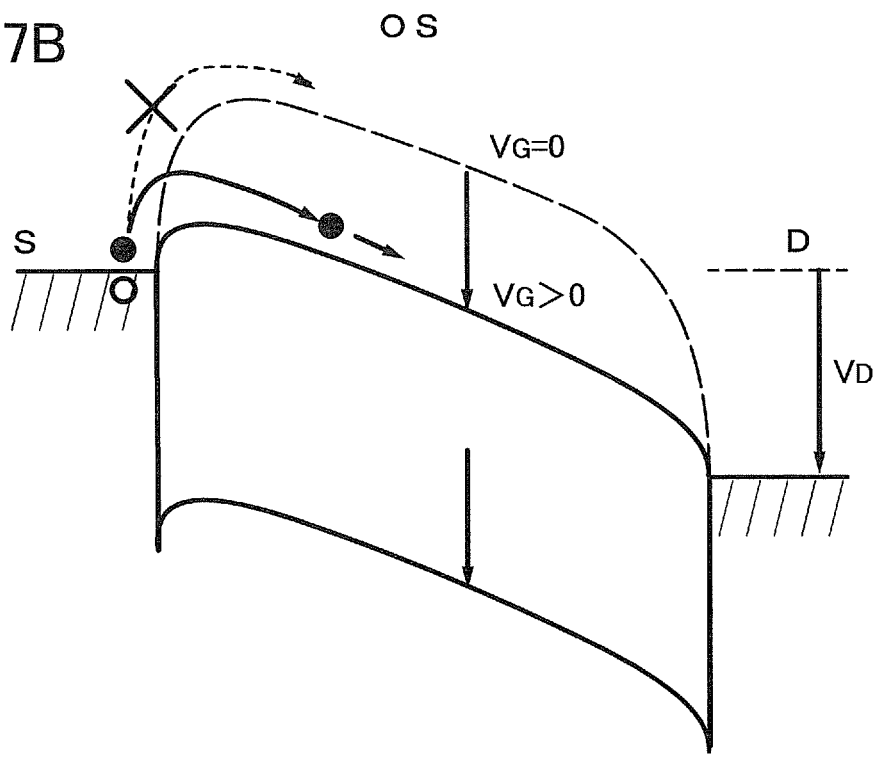

FIGS. 7A and 7B are energy band diagrams (schematic diagrams) in an A-A' cross section in FIG. 6. FIG. 7A illustrates the case where an electrical potential difference between the source electrode (S) and the drain electrode (D) is zero (the source electrode and the drain electrode have the same potential, $V_D=0$ V). FIG. 7B illustrates the case where the potentials of the drain electrode and the gate electrode are higher than that of the source electrode ($V_D>0$V). In FIG. 7B, a broken line indicates the case where voltage is not applied to the gate electrode ($V_G=0$V), and a solid line indicates the case where voltage is applied to the gate electrode ($V_G>0$V). In the case where voltage is not applied to the gate electrode, a carrier (an electron) is not injected from the electrode to an oxide semiconductor side due to a high potential barrier, so that current does not flow, which means an off state. In contrast, when positive voltage is applied to the gate electrode, the potential barrier is decreased, so that current flows, which means an on state.

In FIG. 7B, a black circle (•) indicates an electron. When positive potentials are applied to the gate electrode and the drain electrode (D), as indicated by the solid line, the electron is injected into the oxide semiconductor (OS) over a barrier (h) and flows toward the drain electrode (D). The height of the barrier (h) changes depending on the gate voltage and the drain voltage. In the case where positive drain voltage is applied, the height of the barrier (h) is smaller than the height of the barrier in FIG. 7A where no voltage is applied, i.e., half of the band gap ($E_g$).

Figure 8A:
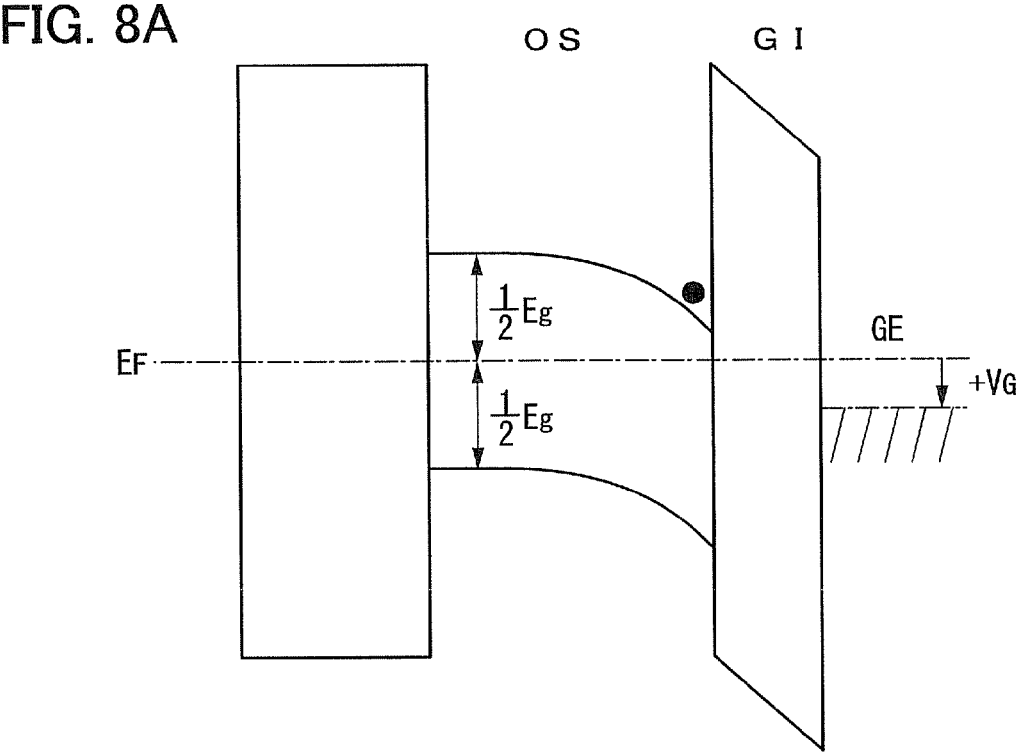
FIGS. 8A and 8B are energy band diagrams.

In this case, as illustrated in FIG. 8A, the electron moves in the vicinity of an interface between the gate insulating film (GI) and the oxide semiconductor (OS) (the lowest part of the oxide semiconductor that is energetically stable).

Figure 8B:
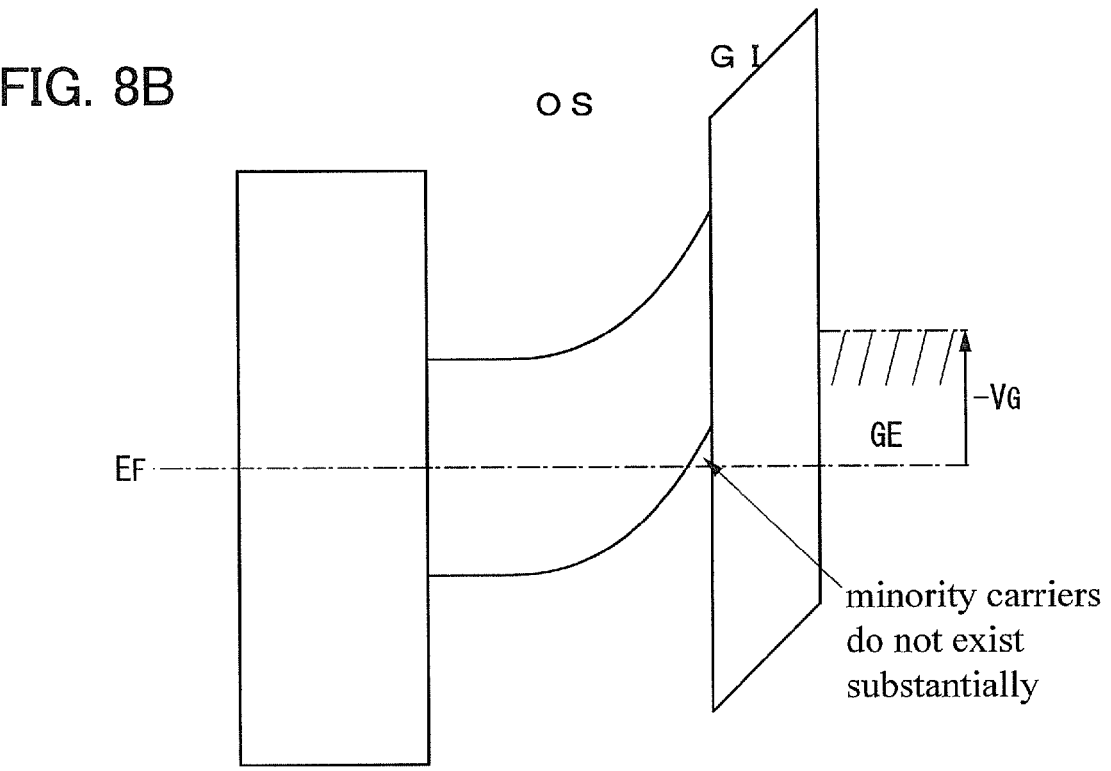

Further, as illustrated in FIG. 8B, when a negative potential is applied to the gate electrode (GE), the amount of off-state current is extremely close to zero because holes that are minority carriers do not exist substantially.

In this manner, when a transistor is formed using an intrinsic or substantially intrinsic oxide semiconductor, the amount of off-state current can be substantially zero. In addition, the temperature characteristics of the transistor are favorable. Typically, in the temperature range of from −25 to 150° C., the current-voltage characteristics of the transistor, such as on-state current, off-state current, field-effect mobility, a sub-threshold value (an S value), and threshold voltage, hardly change and deteriorate due to temperature.

Note that in the intrinsic or substantially intrinsic oxide semiconductor, interface characteristics with the gate insulating film become noticeable. Therefore, an interface between the gate insulating film and the oxide semiconductor is preferably favorable. Specifically, for example, it is preferable to use an insulating film formed by CVD with the use of high-density plasma generated with a power frequency in the range of the VHF band to the microwave band, an insulating film formed by sputtering, or the like.

Since the band gap ($E_g$) of the oxide semiconductor is larger than the band gap of silicon, avalanche breakdown does not easily occur. Therefore, a transistor including an oxide semiconductor has high drain withstand voltage, so that on-state current does not easily increase sharply in an exponential manner even when a high electric field is applied.

As illustrated in FIG. 1, the liquid crystal display device including the transistor of this embodiment does not necessarily include a capacitor in the pixel 100. Therefore, when the pixel illustrated in FIG. 1 is compared to the conventional pixel illustrated in FIG. 13, the time taken to store the storage capacitance $C_S$ of the capacitor is not needed, so that a signal can be written to the pixel 100 at high speed.

Note the liquid crystal display device can include a capacitor. Even when the liquid crystal display device includes a capacitor, the storage capacitance $C_S$ can be decreased because the leakage current of the transistor 101 is sufficiently low. Thus, the time taken to store electric charge can be shortened.

In this embodiment, the example of a bottom-gate thin film transistor with an inverted staggered structure is described; however, the thin film transistor may be either a top-gate thin film transistor or a staggered thin film transistor. Alternatively, a channel-etched thin film transistor or a channel-stop thin film transistor can be employed as appropriate.

Note that the following can be used for the liquid crystal element: a nematic liquid crystal, a cholesteric liquid crystal, a smectic liquid crystal, a discotic liquid crystal, a thermotropic liquid crystal, a lyotropic liquid crystal, a low-molecular liquid crystal, a polymer liquid crystal, a polymer dispersed liquid crystal (PDLC), a ferroelectric liquid crystal, an anti-ferroelectric liquid crystal, a main-chain liquid crystal, a side-chain polymer liquid crystal, a plasma addressed liquid crystal (PALC), a banana-shaped liquid crystal, and the like.

In addition, the following can be used as the display method of the liquid crystal display device: a TN mode, an STN mode, an IPS mode, an FFS mode, an MVA mode, a PVA mode, an ASV mode, an ASM mode, an OCB mode, an ECB mode, an FLC mode, an AFLC mode, a PDLC mode, a guest-host mode, a blue phase mode, and the like. Note that the present invention is not limited to this, and a variety of liquid crystal elements and driving methods thereof can be used as a liquid crystal element and a driving method thereof.

This embodiment can be combined with any of the other embodiments as appropriate.

Embodiment 2

In this embodiment, the case where an FFS mode is used as the display method of a liquid crystal display device is described.

Figure 2A:
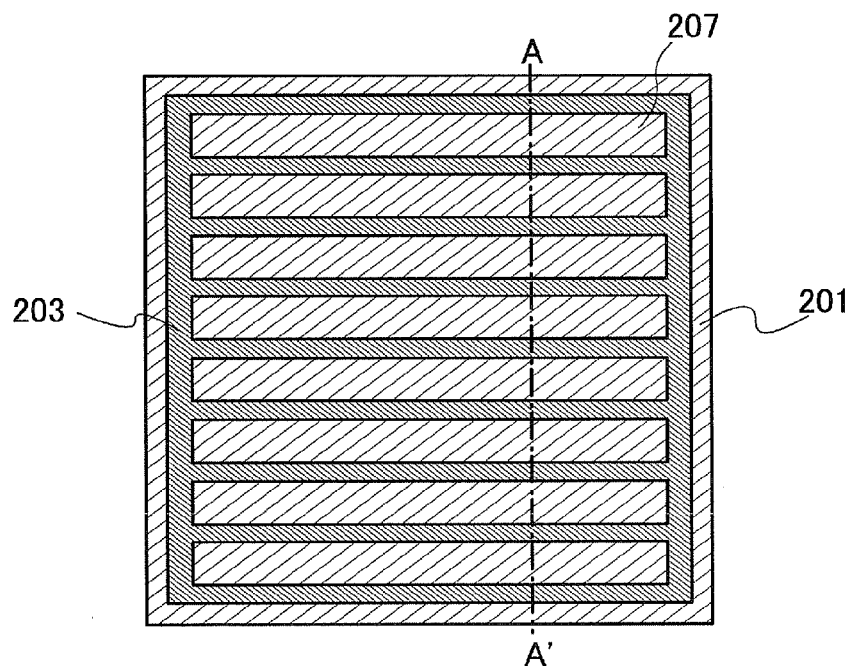
FIGS. 2A and 2B illustrate an electrode structure of a display device.
Figure 2B:
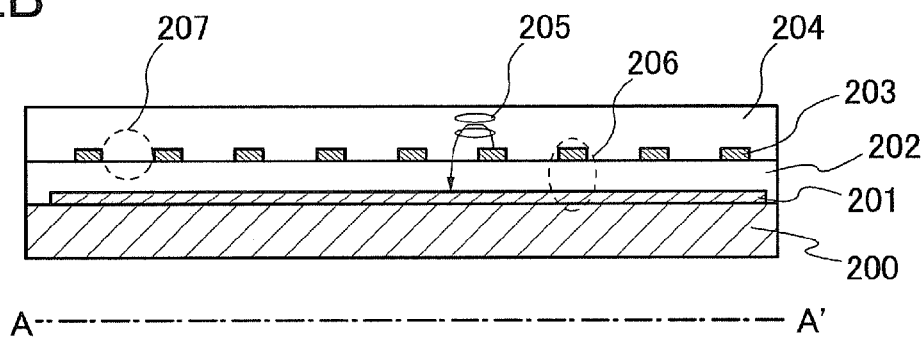
Figure 13:
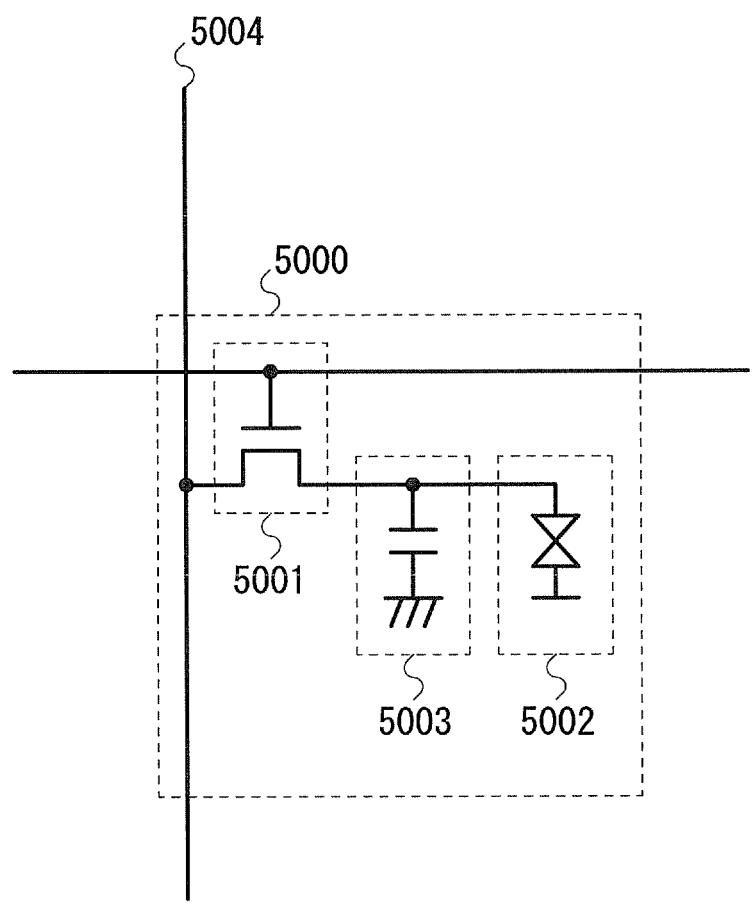
FIG. 13 illustrates a pixel in a display device.

First, FIGS. 2A and 2B illustrate an example of an electrode structure in a pixel with a conventional FFS mode. In FIGS. 2A and 2B, the liquid crystal element 5002 in the pixel circuit in FIG. 13 is illustrated. FIG. 2A is a top view and FIG. 2B is a cross-sectional view.

In FIGS. 2A and 2B, an electrode 201 is formed over a substrate 200; an insulating film 202 is formed so as to cover the electrode 201; an electrode 203 is formed over the insulating film 202; and a liquid crystal layer 204 is formed over the electrode 203. One of the electrode 201 and the electrode 203 is a pixel electrode. The other is a common electrode. The electrode 203 has a slit 207 (an opening portion). The electrode 201 is a plate-like (a shape covering the entire surface) electrode. The insulating film 202 may be a single layer or a stacked layer.

When a horizontal electric field is applied to the liquid crystal layer 204 by an FFS mode, a liquid crystal 205 is aligned in a lateral direction; thus, the viewing angle of the liquid crystal display device can be widen.

In a conventional structure, as illustrated in FIGS. 2A and 2B, the electrode 201 is a plate-like electrode and a capacitor 206 (storage capacitance $C_S$) is formed in a portion where the electrode 201 and the electrode 203 overlap with each other. In this case, as described in Embodiment 1, the time taken to write a signal becomes longer by the time taken to store the storage capacitance $C_S$.

Figure 3A:
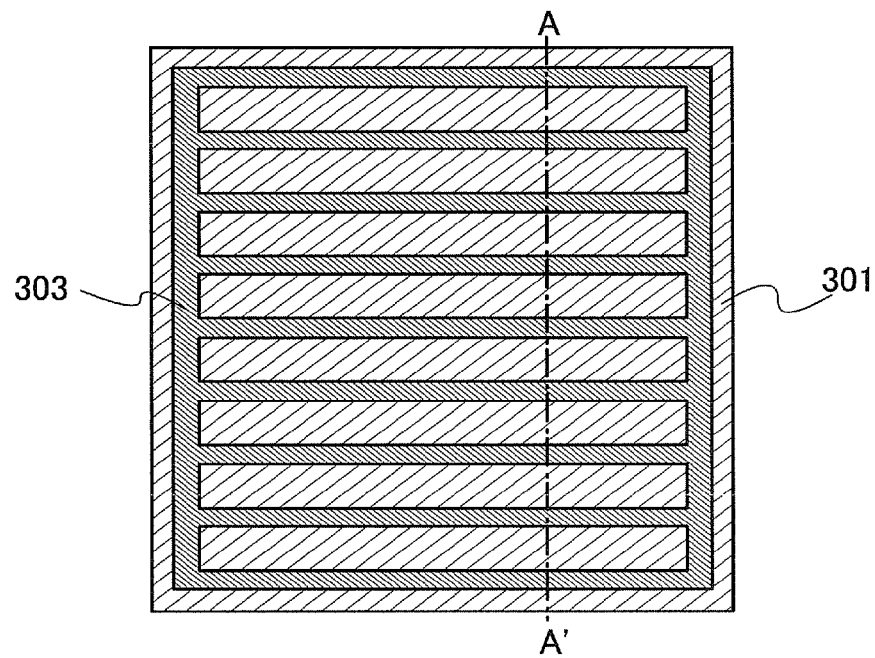
FIGS. 3A and 3B illustrate an electrode structure of a display device.
Figure 3B:
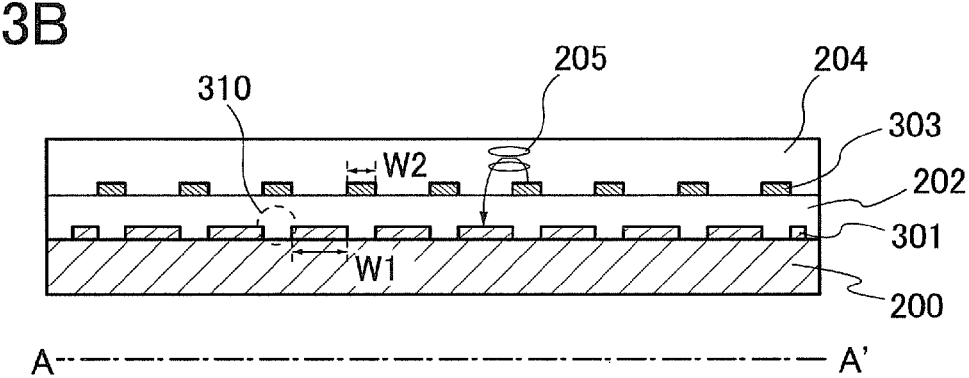

Therefore, an FFS mode in this embodiment has an electrode structure illustrated in FIGS. 3A and 3B. In FIGS. 3A and 3B, the liquid crystal element 102 in the pixel circuit in FIG. 1 is illustrated. FIG. 3A is a top view and FIG. 3B is a cross-sectional view.

FIGS. 3A and 3B differ from FIGS. 2A and 2B in that an electrode 301 and an electrode 303 do not overlap with each other or overlap with each other in a smaller area as compared to the conventional structure, as illustrated in FIG. 3B. In the case of the structure illustrated in FIG. 3B, a capacitor is not formed between the electrode 301 and the electrode 303, and parasitic capacitance generated between the electrode 301 and the electrode 303 is greatly decreased. Further, when an end portion of the electrode 301 and an end portion of the electrode 303 are aligned with each other, a horizontal electric field generated by the electrode 301 and the electrode 303 is easily applied.

In other words, with a structure where the electrode 301 and the electrode 303 do not overlap with each other and the end portion of the electrode 301 and the end portion of the electrode 303 are aligned with each other, an advantageous effect of alignment in a lateral direction by an FFS mode and an advantageous effect of the decrease in time taken to write a signal due to the decrease in the storage capacitance $C_S$ can be obtained in a synergistic manner. When the electrode 301 is formed, etching may performed so that a slit 310 (an opening portion) is provided, and the electrode 303 may be formed over the slit 310. This structure also includes the case where a small part of the electrode 301 is formed below the electrode 303 or a narrow gap is generated between the end portions of the electrodes due to a slight difference in manufacturing steps.

Note that in FIG. 3B, when the width W1 of the electrode 301 is larger than the width W2 of the electrode 303, a horizontal electric field to be applied to the liquid crystal layer 204 is easily applied, which is particularly effective.

Further, in FIG. 3B, an interval between the electrodes 303 (the width of the slit 310) is equal to the width W1 of the electrode 301; however, the width W1 is made smaller than the interval between the electrodes 303 so that an offset state can be obtained.

The electrode structure in FIGS. 3A and 3B is particularly effective when an oxide semiconductor of one embodiment of the present invention is used for a transistor. When an intrinsic or substantially intrinsic oxide semiconductor is used and the off-state current of the transistor is $1 \times 10^{-17}$ A/μm or less, the pixel does not necessarily include a capacitor; thus, the time taken to write a signal can be shortened.

Note that the pixel can include a capacitor. Even when the pixel includes a capacitor, the storage capacitance $C_S$ can be decreased because the leakage current of the transistor is sufficiently low. Thus, the time taken to store electric charge can be shortened. In that case, in FIGS. 3A and 3B, the electrode 301 and the electrode 303 partly overlap with each other so that a capacitor with a small area may be formed. Such a structure is effective because it is not necessary to decrease a display region.

Figure 4A:
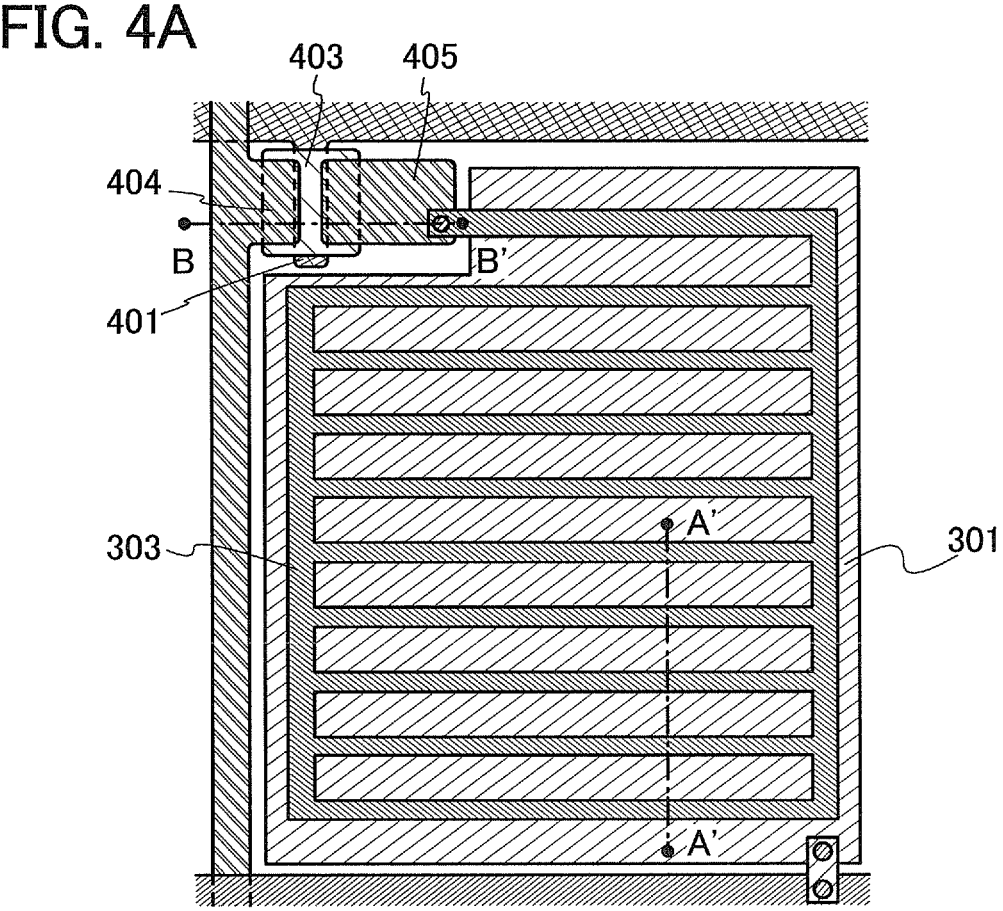
FIGS. 4A and 4B illustrate a pixel in a display device.
Figure 4B:
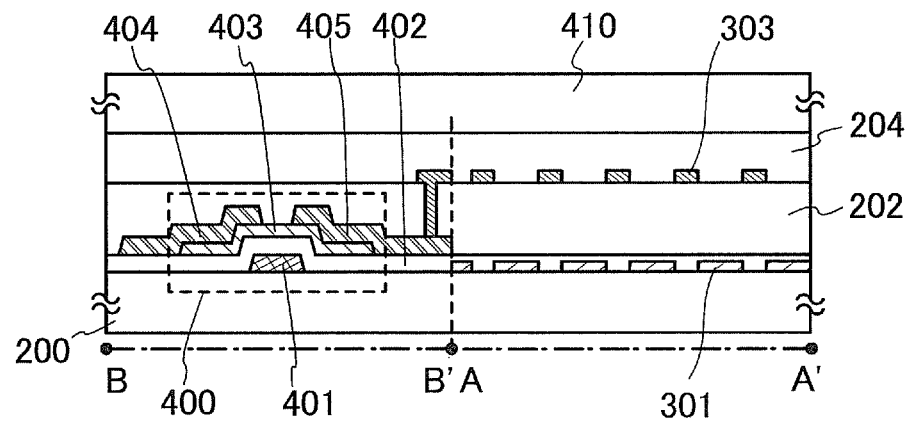

FIGS. 4A and 4B illustrate a structure where the pixel in FIG. 1 is formed using the electrode structure in FIGS. 3A and 3B. FIG. 4A is a top view and FIG. 4B is a cross-sectional view. A cross-sectional view taken along line A-A' illustrates the transistor 101. A cross-sectional view taken along line B-B' illustrates the liquid crystal element 102 in FIG. 1 in which the electrode structure in FIGS. 3A to 3B is employed.

In the cross-sectional view taken along line A-A', a gate electrode 401, a gate insulating film 402, an oxide semiconductor layer 403, an electrode 404, and an electrode 405 are provided between the substrate 200 and a substrate 410 so that a transistor 400 is formed. One of the electrode 404 and the electrode 405 is a source electrode. The other is a drain electrode. An intrinsic or substantially intrinsic oxide semiconductor of one embodiment of the present invention can be used for the oxide semiconductor layer 403.

In addition, the electrode 405 is electrically connected to the electrode 303. FIGS. 4A and 4B illustrate just an example, and the electrode 405 may be electrically connected to the electrode 301. Further, when a structure in which the gate electrode 401 and the electrode 301 are formed in the same layer, a structure in which the electrode 404, the electrode 405, and the electrode 301 are formed in the same layer, or a structure in which the electrode 404, the electrode 405, and the electrode 303 are formed in the same layer is employed, the number of steps may be reduced.

The electrode 301 and the electrode 303 can be formed to have a single-layer structure or a layered structure including a metal material such as molybdenum (Mo), titanium (Ti), chromium (Cr), tantalum (Ta), tungsten (W), aluminum (Al), copper (Cu), neodymium (Nd), or scandium (Sc), or an alloy containing the metal material as its main component.

Various kinds of metal oxide materials, for example, conductive metal oxides such as indium oxide ($In_2O_3$), tin oxide ($SnO_2$), and zinc oxide (ZnO); an alloy containing indium oxide and tin oxide ($In_2O_3$—$SnO_2$, which is abbreviated as ITO); and an alloy containing indium oxide and zinc oxide ($In_2O_3$—ZnO) can be used. Alternatively, any of these metal oxide materials may contain silicon or silicon oxide. These metal oxide materials have light-transmitting properties.

At least one of the electrode 301 and the electrode 303 is preferably formed using the light-transmitting material.

Note that FIGS. 4A and 4B illustrate the example of a bottom-gate thin film transistor with an inverted staggered structure; however, the thin film transistor may be either a top-gate thin film transistor or a staggered thin film transistor. Alternatively, a channel-etched thin film transistor or a channel-stop thin film transistor can be employed as appropriate.

Further, although not illustrated, an alignment film, a color filter, a light-blocking film, a spacer, a filler, or the like can be provided as appropriate.

This embodiment can be combined with any of the other embodiments as appropriate.

Embodiment 3

In this embodiment, an example of a method for manufacturing a semiconductor device is described with reference to FIGS. 9A to 9E.

First, after a conductive film is formed over a substrate 1000 having an insulating surface, a gate electrode 1001 is formed in a first photolithography process. End portions of the gate electrode 1001 are preferably tapered because coverage with a gate insulating film stacked thereover is improved.

Although there is no particular limitation on a substrate which can be used as the substrate 1000 having an insulating surface, it is necessary that the substrate have at least heat resistance high enough to withstand heat treatment to be performed later. For example, various kinds of glass substrates can be used.

In the case where the temperature of the heat treatment to be performed later is high, a substrate whose strain point is higher than or equal to 730° C. is preferably used as a glass substrate. For the glass substrate, for example, a glass material such as aluminosilicate glass, aluminoborosilicate glass, or barium borosilicate glass is used. By containing more barium oxide (BaO) than boron oxide ($B_2O_3$), a more practical heat-resistant glass substrate can be obtained. Therefore, a glass substrate containing more BaO than $B_2O_3$ is preferably used.

Note that instead of the glass substrate, a substrate formed using an insulator, such as a ceramic substrate, a quartz substrate, or a sapphire substrate, may be used. Alternatively, a crystallized glass substrate or the like can be used. Alternatively, a plastic substrate or the like can be used as appropriate.

An insulating film which serves as a base film may be provided between the substrate 1000 and the gate electrode 1001. The base film has a function of preventing diffusion of an impurity element from the substrate 1000, and can be formed to have a single-layer structure or a layered structure including one or more films selected from a silicon nitride film, a silicon oxide film, a silicon nitride oxide film, or a silicon oxynitride film.

In addition, the gate electrode 1001 can be formed to have a single-layer structure or a layered structure including a metal material such as molybdenum (Mo), titanium (Ti), chromium (Cr), tantalum (Ta), tungsten (W), aluminum (Al), copper (Cu), neodymium (Nd), or scandium (Sc), or an alloy containing the metal material as its main component.

Next, a gate insulating film 1002 is formed over the gate electrode 1001.

The gate insulating film 1002 can be formed to have a single-layer structure or a layered structure including a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer by plasma-enhanced CVD, sputtering, or the like. In the case where a silicon oxide layer is deposited by sputtering, a silicon target or a quartz target is used as a target and oxygen or a mixed gas of oxygen and argon is used as a sputtering gas.

Here, an intrinsic or substantially intrinsic oxide semiconductor (a highly purified oxide semiconductor) which is formed over the gate insulating film 1002 is highly sensitive to an interface state and interface charge. Therefore, the gate insulating film 1002 which forms an interface needs to have high quality.

For example, high-density plasma-enhanced CVD using microwaves (e.g., a frequency of 2.45 GHz) is preferable because a dense high-quality insulating film having high withstand voltage can be formed. This is because when the highly purified oxide semiconductor is closely in contact with the high-quality gate insulating film, the interface state can be reduced and interface properties can be favorable.

Needless to say, a different deposition method such as sputtering or plasma-enhanced CVD can be used as long as a high-quality insulating film can be formed as the gate insulating film 1002. In addition, any gate insulating film can be used as long as film quality and properties of an interface with an oxide semiconductor of the gate insulating film are modified by heat treatment performed after deposition. In either case, any gate insulating film can be used as long as film quality as a gate insulating film is high, interface state density with an oxide semiconductor is decreased, and a favorable interface can be formed.

The gate insulating film 1002 can have a structure in which a nitride insulating film and an oxide insulating film are sequentially stacked from the gate electrode 1001 side. For example, a 100-nm-thick gate insulating film is formed in such a manner that a silicon nitride film ($SiN_y$ (y>0)) with a thickness of 50 to 200 nm is formed as a first gate insulating film by sputtering and a silicon oxide film ($SiO_x$ (x>0)) with a thickness of 5 to 300 nm is stacked as a second gate insulating film over the first gate insulating film. The thickness of the gate insulating film may be set as appropriate depending on characteristics needed for the transistor and may be approximately 350 to 400 nm.

Figure 9A:
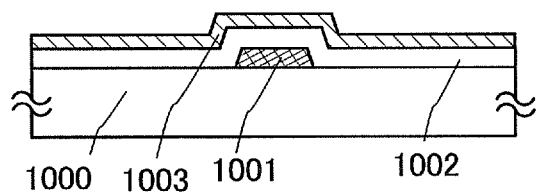
FIGS. 9A to 9E illustrate a method for manufacturing a semiconductor device.

Then, an oxide semiconductor film 1003 is formed to a thickness of 2 to 200 nm over the gate insulating film 1002 (see FIG. 9A).

The oxide semiconductor film 1003 can be formed using In—Sn—Ga—Zn—O, In—Ga—Zn—O, In—Sn—Zn—O, In—Al—Zn—O, Sn—Ga—Zn—O, Al—Ga—Zn—O, Sn—Al—Zn—O, In—Zn—O, Sn—Zn—O, Al—Zn—O, Zn—Mg—O, Sn—Mg—O, In—Mg—O, In—O, Sn—O, or Zn—O.

Alternatively, an oxide semiconductor material represented by In-A-B—O may be used. Here, A represents one or more kinds of elements selected from an element which belongs to Group 13, such as gallium (Ga) or aluminum (Al), or an element which belongs to Group 14, such as silicon (Si) or germanium (Ge). Further, B represents one or more kinds of elements selected from an element which belongs to Group 12, such as zinc (Zn). Note that the contents of In, A, and B are given content, and the content of A might be zero. However, the contents of In and B are not zero. That is, the oxide semiconductor material expressed as In-A-B—O might be In—Ga—Zn—O or In—Zn—O, for example.

In particular, an In—Ga—Zn—O-based oxide semiconductor material has sufficiently high resistance when there is no electric field, can have sufficiently low off-state current, and has high field-effect mobility; thus, it is favorably used as an oxide semiconductor material used in a semiconductor device.

As a typical example of the In—Ga—Zn—O-based oxide semiconductor material, there is an oxide semiconductor material represented by $InGaO_3(ZnO)_m$ (m>0). Further, there is an oxide semiconductor material represented by $InMO_3(ZnO)_m$ (m>0) when M is used instead of Ga. Here, M denotes one or more metal elements selected from gallium (Ga), aluminum (Al), iron (Fe), nickel (Ni), manganese (Mn), cobalt (Co), or the like. For example, M can be Ga, Ga and Al, Ga and Fe, Ga and Ni, Ga and Mn, Ga and Co, or the like. Note that the composition is just an example.

In this embodiment, the oxide semiconductor film 1003 is formed using an In—Ga—Zn—O-based metal oxide as a target by sputtering.

As a target used for forming the oxide semiconductor film 1003 by sputtering, for example, the composition ratio of a target including In, Ga, and Zn is In:Ga:Zn=1:x:y. Here, x is 0 to 2 and y is 1 to 5. For example, a target having a composition ratio of In:Ga:Zn=1:1:1 [atomic ratio] (x=1 and y=1) (i.e., $In_2O_3$:$Ga_2O_3$:ZnO=1:1:2 [molar ratio]) may be used. Alternatively, as the target, a metal oxide having a composition ratio of In:Ga:Zn=1:1:0.5 [atomic ratio], a metal oxide having a composition ratio of In:Ga:Zn=1:1:2 [atomic ratio], or a metal oxide having a composition ratio of In:Ga:Zn=1:0:1 [atomic ratio] (x=0 and y=1) can be used.

The substrate 1000 is held in a treatment chamber kept under reduced pressure and is heated at room temperature or a temperature lower than 400° C. A sputtering gas from which hydrogen and moisture are removed is introduced while moisture remaining in the treatment chamber is removed. Then, the oxide semiconductor film 1003 is deposited using metal oxide as a target. In order to remove moisture remaining in the treatment chamber, an adsorption vacuum pump is preferably used. For example, a cryopump, an ion pump, or a titanium sublimation pump is preferably used. As an exhaust means, a turbo pump to which a cold trap is added may be used. For example, a hydrogen atom, a compound containing a hydrogen atom, such as water ($H_2O$) (preferably a compound containing a carbon atom), and the like are exhausted from the treatment chamber with the use of a cryopump. Therefore, the concentration of an impurity contained in the oxide semiconductor film deposited in the treatment chamber can be lowered. Further, by performing deposition by sputtering while removing moisture remaining in the treatment chamber with the use of a cryopump, the substrate temperature when the oxide semiconductor film 1003 is deposited can be higher than or equal to room temperature and lower than 400° C.

Figure 9B:
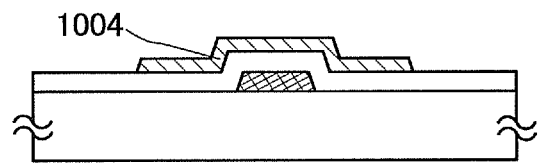

Then, the oxide semiconductor film is processed into an island-shaped oxide semiconductor layer 1004 in a second photolithography process (see FIG. 9B).

Next, a conductive film is formed over the gate insulating film 1002 and the oxide semiconductor layer 1004. The conductive film may be formed by sputtering or vacuum evaporation. As the conductive film, an element selected from aluminum (Al), chromium (Cr), copper (Cu), tantalum (Ta), titanium (Ti), molybdenum (Mo), or tungsten (W); an alloy including any of these elements; an alloy film including any of these elements in combination; or the like can be used. Alternatively, when an Al material to which an element preventing generation of hillocks or whiskers in an Al film, such as Si, Ti, Ta, W, Mo, Cr, Nd, Sc, or Y, is added is used, heat resistance can be increased.

Further, the conductive film may have a single-layer structure or a layered structure of two or more layers. For example, a single-layer structure of an aluminum film including silicon, a two-layer structure in which a titanium film is stacked over an aluminum film, a three-layer structure in which a titanium film, an aluminum film, and a titanium film are stacked in that order, or the like can be used. For example, a structure may be employed in which a refractory metal layer of Cr, Ta, Ti, Mo, W, or the like is stacked over one or both of an upper surface and a lower surface of a metal layer of Al, Cu, or the like.

As the conductive film, a conductive metal oxide such as indium oxide ($In_2O_3$), tin oxide ($SnO_2$), or zinc oxide (ZnO); an alloy containing indium oxide and tin oxide ($In_2O_3$—$SnO_2$, which is abbreviated as ITO); or an alloy containing indium oxide and zinc oxide ($In_2O_3$—ZnO) can be used. Alternatively, the metal oxide material can contain silicon or silicon oxide.

In this embodiment, the conductive film is formed using titanium (Ti).

Figure 9C:
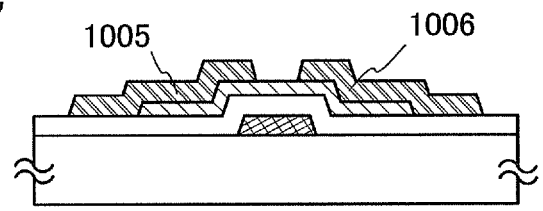

A source electrode 1005 and a drain electrode 1006 are formed in a third photolithography process (see FIG. 9C).

Note that each material and etching conditions are adjusted as appropriate so that the oxide semiconductor layer 1004 is not removed when the conductive film is etched.

Note that in the third photolithography process, only part of the oxide semiconductor layer 1004 is etched so that an oxide semiconductor layer having a groove (a depression) is formed in some cases.

Figure 9D:
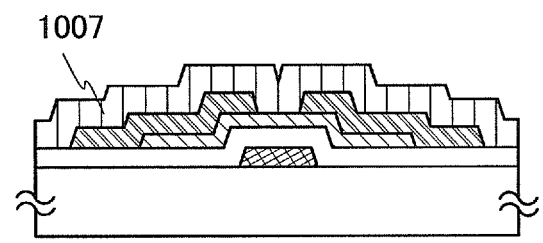

Then, an oxide insulating film 1007 which serves as a protective insulating film is formed in contact with part of the oxide semiconductor layer 1004 (see FIG. 9D).

In this embodiment, the oxide semiconductor layer 1004 and the oxide insulating film 1007 are formed so as to be in contact with each other in a region where the oxide semiconductor layer 1004 does not overlap with the source electrode 1005 and the drain electrode 1006.

In this embodiment, a silicon oxide layer having a defect is deposited as the oxide insulating film 1007 in such a manner that the substrate 1000 over which the films up to the island-shaped oxide semiconductor layer 1004, the source electrode 1005, and the drain electrode 1006 are formed is heated at room temperature or a temperature lower than 100° C., a sputtering gas including high-purity oxygen from which hydrogen and moisture are removed is introduced, and a silicon semiconductor target is used.

Note that the oxide insulating film 1007 is preferably formed while moisture remaining in the treatment chamber is being removed so that hydrogen, a hydroxyl group, or moisture is not contained in the oxide semiconductor layer 1004 and the oxide insulating film 1007.

In order to remove moisture remaining in the treatment chamber, an adsorption vacuum pump is preferably used. For example, a cryopump, an ion pump, or a titanium sublimation pump is preferably used. As an exhaust means, a turbo pump to which a cold trap is added may be used. For example, a hydrogen atom, a compound containing a hydrogen atom, such as water ($H_2O$), and the like are exhausted from the treatment chamber with the use of a cryopump. Therefore, the concentration of an impurity contained in the oxide semiconductor film 1007 deposited in the treatment chamber can be lowered.

Note that as the oxide insulating film 1007, a silicon oxynitride layer, an aluminum oxide layer, an aluminum oxynitride layer, or the like can be used instead of the silicon oxide layer.

In addition, heat treatment may be performed at 100 to 400° C. in a state where the oxide insulating film 1007 and the oxide semiconductor layer 1004 are in contact with each other. Since the oxide insulating film 1007 in this embodiment includes many defects, by the heat treatment, an impurity such as hydrogen, moisture, a hydroxyl group, or hydride contained in the oxide semiconductor layer 1004 is diffused into the oxide insulating film 1007, so that the impurity contained in the oxide semiconductor layer 1004 can be further reduced. Through the heat treatment, oxygen contained in the semiconductor insulating film 1007 is supplied to the oxide semiconductor layer 1004.

Figure 9E:
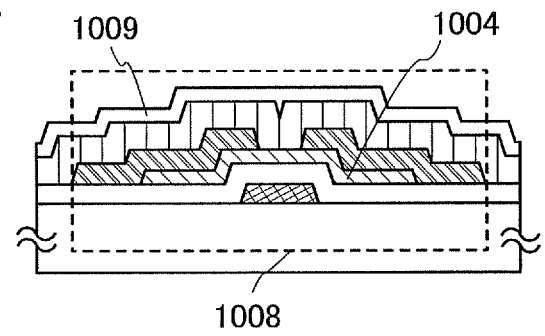

Through the above steps, a transistor 1008 including the oxide semiconductor layer 1004 can be formed (see FIG. 9E).

The oxide semiconductor layer 1004 is highly purified by sufficient removal of an impurity such as hydrogen and the supply of oxygen. Specifically, the concentration of hydrogen in the oxide semiconductor layer 1004 is $5 \times 10^{19}/cm^3$ or lower, preferably $5 \times 10^{18}/cm^3$ or lower, more preferably $5 \times 10^{17}/cm^3$ or lower. The carrier concentration of the oxide semiconductor layer 1004 is much lower than a conventional oxide semiconductor layer (e.g., $1 \times 10^{12}/cm^3$ or lower, preferably $1.45 \times 10^{10}/cm^3$ or lower). With the use of an intrinsic or substantially intrinsic oxide semiconductor in this manner, the transistor 1008 whose off-state current is $1 \times 10^{17}$ A/μm or less can be obtained. The concentration of hydrogen can be measured by, for example, secondary ion mass spectroscopy (SIMS) or the like. Further, the carrier concentration can be measured by manufacture of a MOS capacitor with the use of an oxide semiconductor and, for example, by evaluation of the results of CV measurement (CV characteristics) or the like.

A protective insulating film 1009 may be provided over the oxide insulating film 1007. In this embodiment, the protective insulating film 1009 is formed over the oxide insulating film 1007. As the protective insulating film 1009, a silicon nitride film, a silicon nitride oxide film, an aluminum nitride film, an aluminum nitride oxide film, or the like is used.

The transistor 1008 formed by the method of this embodiment can be used in the liquid crystal display devices in Embodiments 1 and 2. A capacitor is not necessarily provided in a pixel. When a capacitor is not provided in a pixel, the time taken to store the storage capacitance $C_S$ of the capacitor is not needed; thus, the total time taken to store electric charge can be shortened.

The above steps can be used for manufacture of a backplane (a substrate provided with a thin film transistor) of an electroluminescent display panel, a display device including electronic ink, or the like. Since the above steps are performed at a temperature of 400° C. or lower, they can also be applied to manufacturing steps in which a glass substrate having a thickness of 1 mm or less and a side longer than 1 m is used. In addition, since all the steps can be performed at a treatment temperature of 400° C. or lower, a large amount of energy is not needed for manufacturing a display device.

Note that in this embodiment, an example of a bottom-gate thin film transistor with an inverted staggered structure is described; however, the thin film transistor may be either a top-gate thin film transistor or a staggered thin film transistor. Alternatively, a channel-etched thin film transistor or a channel-stop thin film transistor can be employed as appropriate.

This embodiment can be combined with any of the other embodiments as appropriate.

Embodiment 4

In this embodiment, FIGS. 10A to 10F illustrate examples of electronic devices each including the display device described in the above embodiment.

Figure 10A:
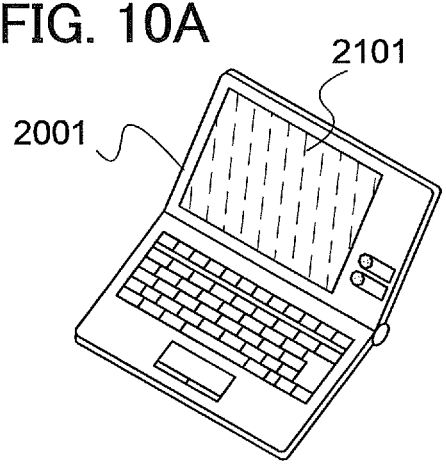
FIGS. 10A to 10F illustrate examples of electronic devices.

FIG. 10A illustrates a laptop personal computer. A main body 2001 includes a display portion 2101.

Figure 10D:
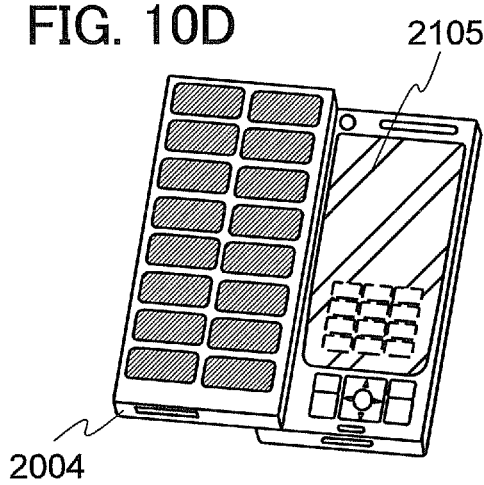
Figure 10B:
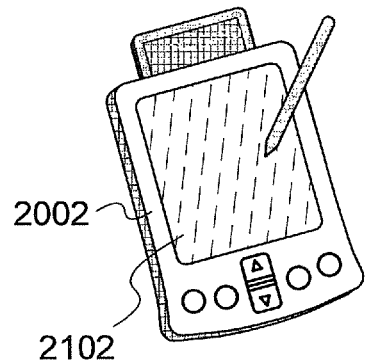

FIG. 10B illustrates a personal digital assistant (PDA). A main body 2002 includes a display portion 2102.

Figure 10E:
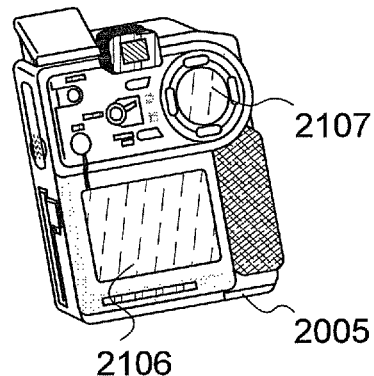
Figure 10C:
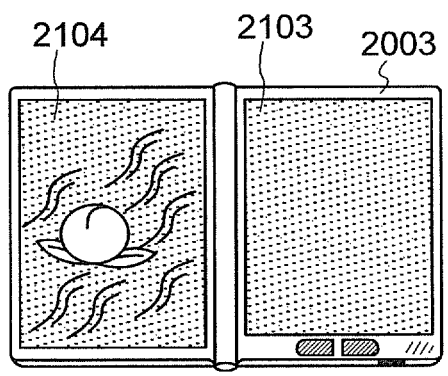

FIG. 10C illustrates an e-book reader as an example of electronic paper. A main body 2003 includes a display portion 2103 and a display portion 2104.

FIG. 10D illustrates a cellular phone. A main body 2004 includes a display portion 2105.

FIG. 10E illustrates a digital camera. A main body 2005 includes a display portion 2106 and a display portion 2107.

Figure 10F:
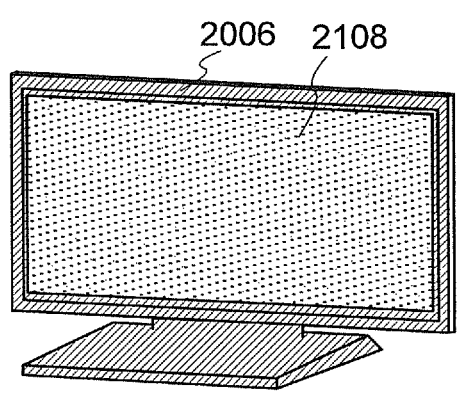

FIG. 10F illustrates a television set. A main body 2006 includes a display portion 2108.

In the electronic devices in FIGS. 10A to 10F, by provision of the display device described in the above embodiment as the display portions 2101 to 2108, provision of a capacitor can be omitted or a capacitance value can be reduced as much as possible; thus, a signal can be written at high speed. Further, overdrive, frame rate doubling, or the like can be efficiently performed, so that the performance of the electronic devices can be drastically improved.

This embodiment can be combined with any of the other embodiments as appropriate.

Example 1

Figure 12:
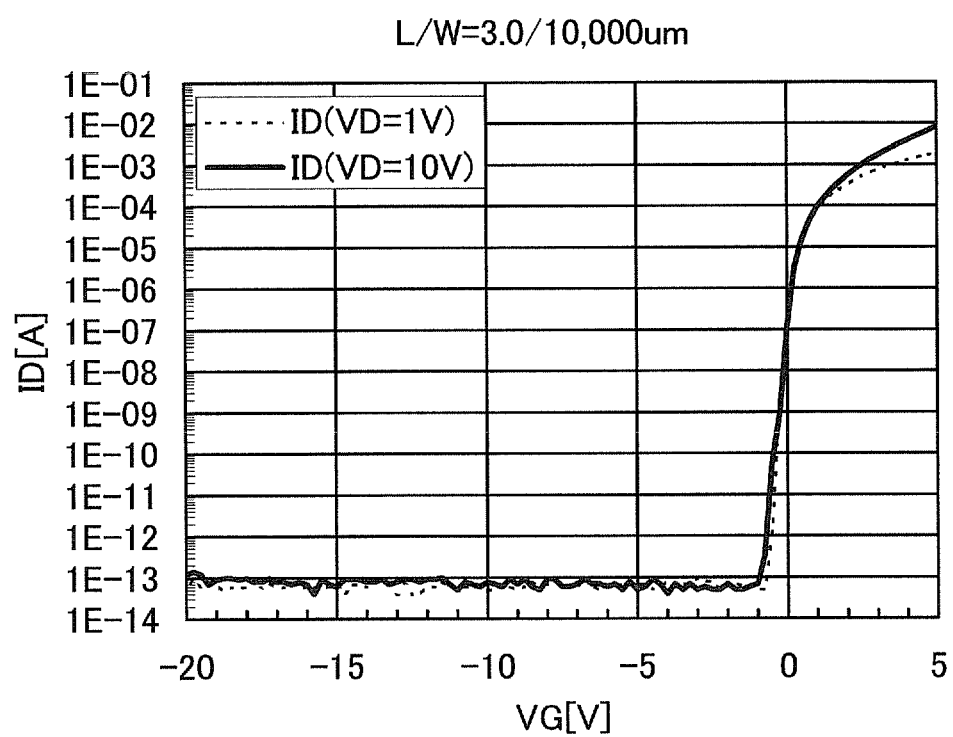
FIG. 12 illustrates electrical characteristics of a transistor.

FIG. 12 illustrates $V_G$-$I_D$ characteristics as the initial characteristics of a transistor including an intrinsic or substantially intrinsic oxide semiconductor film which is obtained by the method in Embodiment 3.

FIG. 12 illustrates measurement results of a sample in which a transistor having a channel width W of $1 \times 10^4$ μm and a channel length L of 3 μm is used and the temperature is room temperature. Off-state current was $1 \times 10^{-13}$ A or less, which was the measurement limit of a measurement device (a parameter analyzer Agilent 4156C Agilent Technologies, Inc.). A subthreshold swing value (an S value) was 0.1 V/dec. Note that off-state current per micrometer of the channel width was $1 \times 10^{-17}$ A/μm. In the sample, two hundred transistors each having a channel width W of 50 μm and a channel length L of 3 μm are connected in parallel so that the transistor having a channel width W of $1 \times 10^4$ μm and a channel length L of 3 μm was formed.

This example can be combined with any of the embodiments as appropriate.

This application is based on Japanese Patent Application serial no. 2009-276374 filed with Japan Patent Office on Dec. 4, 2009, the entire contents of which are hereby incorporated by reference.

The invention claimed is:

1. A display device comprising:
   a pixel, the pixel comprising:
      a transistor; and
      a liquid crystal element,
   wherein the liquid crystal element is electrically connected to one of a source and a drain of the transistor,
   wherein the transistor includes an intrinsic or substantially intrinsic oxide semiconductor layer which includes a channel formation region,
   wherein an off-state current of the transistor is $1 \times 10^{-17}$ A/μm or less, and
   wherein the pixel does not include a capacitor wiring.

2. The display device according to claim 1, wherein a voltage higher than or equal to a voltage of a video signal is input to the liquid crystal element before the video signal is input.

3. A display device comprising:
a pixel, the pixel comprising:
   a transistor; and
   a liquid crystal element,
wherein the liquid crystal element is electrically connected to one of a source and a drain of the transistor,
wherein the transistor includes an intrinsic or substantially intrinsic oxide semiconductor layer which includes a channel formation region,
wherein an off-state current of the transistor is $1 \times 10^{-17}$ A/μm or less,
wherein the pixel does not include a capacitor wiring, and
wherein a parasitic capacitance in the pixel is less than or equal to 50 fF.

4. The display device according to claim 3, wherein a voltage higher than or equal to a voltage of a video signal is input to the liquid crystal element before the video signal is input.

5. A display device comprising:
a pixel, the pixel comprising:
   a first electrode;
   a second electrode, the second electrode comprising a portion not overlapping with the first electrode;
   an insulating film between the first electrode and the second electrode;
   a transistor; and
   a liquid crystal layer,
wherein the liquid crystal layer is over the first electrode and the second electrode,
wherein the second electrode is electrically connected to one of a source and a drain of the transistor,
wherein the transistor includes an intrinsic or substantially intrinsic oxide semiconductor layer which includes a channel formation region,
wherein an off-state current of the transistor is $1 \times 10^{-17}$ A/μm or less, and
wherein the pixel does not include a capacitor wiring.

6. The display device according to claim 5, wherein a voltage higher than or equal to a voltage of a video signal is input to the first electrode before the video signal is input.

7. The display device according to claim 5, wherein the second electrode is over the first electrode.

8. The display device according to claim 5, wherein the first electrode and the second electrode do not overlap with each other.

9. A display device comprising:
a pixel, the pixel comprising:
   a first electrode;
   a second electrode, the second electrode comprising a portion not overlapping with the first electrode;
   an insulating film between the first electrode and the second electrode;
   a transistor; and
   a liquid crystal layer,
wherein the liquid crystal layer is over the first electrode and the second electrode,
wherein the second electrode is electrically connected to one of a source and a drain of the transistor,
wherein the transistor includes an intrinsic or substantially intrinsic oxide semiconductor layer which includes a channel formation region,
wherein an off-state current of the transistor is $1 \times 10^{-17}$ A/μm or less,
wherein the pixel does not include a capacitor wiring, and
wherein a parasitic capacitance in the pixel is less than or equal to 50 fF.

10. The display device according to claim 9, wherein a voltage higher than or equal to a voltage of a video signal is input to the first electrode before the video signal is input.

11. The display device according to claim 9, wherein the second electrode is over the first electrode.

12. The display device according to claim 9, wherein the first electrode and the second electrode do not overlap with each other.

13. A display device comprising:
a pixel, the pixel comprising:
   a transistor; and
   a liquid crystal element,
wherein the liquid crystal element is electrically connected to one of a source and a drain of the transistor,
wherein the transistor includes an oxide semiconductor layer including a channel formation region,
wherein the oxide semiconductor layer comprises a portion in which a concentration of hydrogen is $5 \times 10^{19}$/cm$^3$ or lower,
wherein an off-state current of the transistor is $1 \times 10^{-17}$ A/μm or less, and
wherein the pixel does not include a capacitor wiring.

14. The display device according to claim 13, wherein a voltage higher than or equal to a voltage of a video signal is input to the liquid crystal element before the video signal is input.

15. The display device according to claim 13, wherein a parasitic capacitance in the pixel is less than or equal to 50 fF.

16. A display device comprising:
a pixel, the pixel comprising:
   a transistor; and
   a liquid crystal element,
wherein the liquid crystal element is electrically connected to one of a source and a drain of the transistor,
wherein the transistor includes an oxide semiconductor layer including a channel formation region,
wherein the oxide semiconductor layer comprises a portion in which a carrier concentration is $1 \times 10^{12}$/cm$^3$ or lower,
wherein an off-state current of the transistor is $1 \times 10^{-17}$ A/μm or less, and
wherein the pixel does not include a capacitor wiring.

17. The display device according to claim 16, wherein a voltage higher than or equal to a voltage of a video signal is input to the liquid crystal element before the video signal is input.

18. The display device according to claim 16, wherein a parasitic capacitance in the pixel is less than or equal to 50 fF.

* * * * *